United States Patent [19]
Binks et al.

[11] 3,942,426
[45] Mar. 9, 1976

[54] HEATED SANITARY SANDWICH BIN WITH AIR CURTAINS

[75] Inventors: Chester J. Binks, LaGrange; Steve Kroll, Schaumburg, both of Ill.

[73] Assignee: Restaurant Technology, Inc., Oak Brook, Ill.

[22] Filed: Apr. 14, 1975

[21] Appl. No.: 567,705

[52] U.S. Cl. .................. 99/473; 99/477; 99/443 R; 62/256; 98/36; 219/400; 219/388
[51] Int. Cl.² ...................... A23B 4/04; B65G 55/00
[58] Field of Search ........ 219/388, 399, 400; 98/36; 99/443 R, 473, 474, 475, 476, 477, 478; 62/234, 256, 419

[56] References Cited
UNITED STATES PATENTS

| | | | |
|---|---|---|---|
| 2,502,020 | 3/1970 | Bressichello | 99/443 R |
| 2,715,898 | 8/1955 | Michaelis et al. | 219/400 X |
| 3,239,651 | 3/1966 | Silberman | 219/388 |
| 3,283,753 | 11/1966 | Bodott et al. | 126/110 |
| 3,306,068 | 2/1967 | Allgeyer et al. | 62/256 |
| 3,543,532 | 12/1970 | Gatton et al. | 98/36 X |
| 3,614,923 | 10/1971 | Thompson | 99/443 C X |
| 3,649,812 | 3/1972 | Wilson | 219/396 |
| 3,778,964 | 12/1973 | Rowland | 219/388 X |

*Primary Examiner*—Volodymyr Y. Mayewsky
*Attorney, Agent, or Firm*—Dressler, Goldsmith, Clement & Gordon, Ltd.

[57] ABSTRACT

A sandwich bin for fast food restaurant service. The sandwich bin provides always open front and rear service openings and air curtains for each of the service openings. The air in the air curtains is recycled through chambers at the sides of the sandwich bin to beneath the floor from where it is recirculated through ducts and over heaters to be discharged through air curtain forming nozzles. The turbulence in the sandwich bin is at a minimum, thereby providing an atmosphere in which sandwiches will remain hot and moist, without significant drying.

12 Claims, 6 Drawing Figures

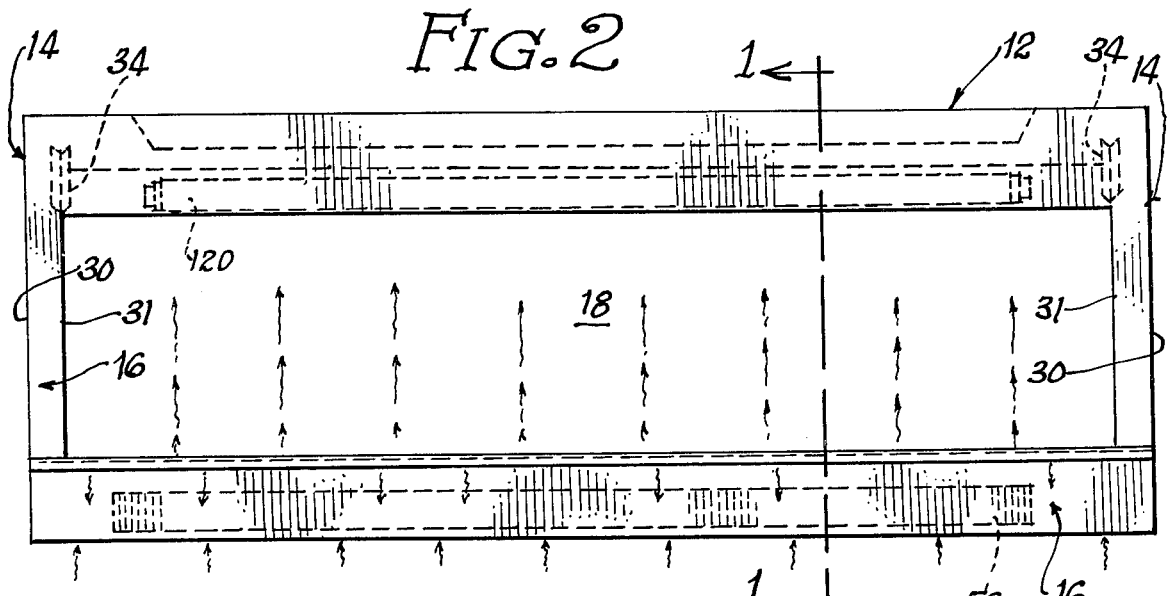
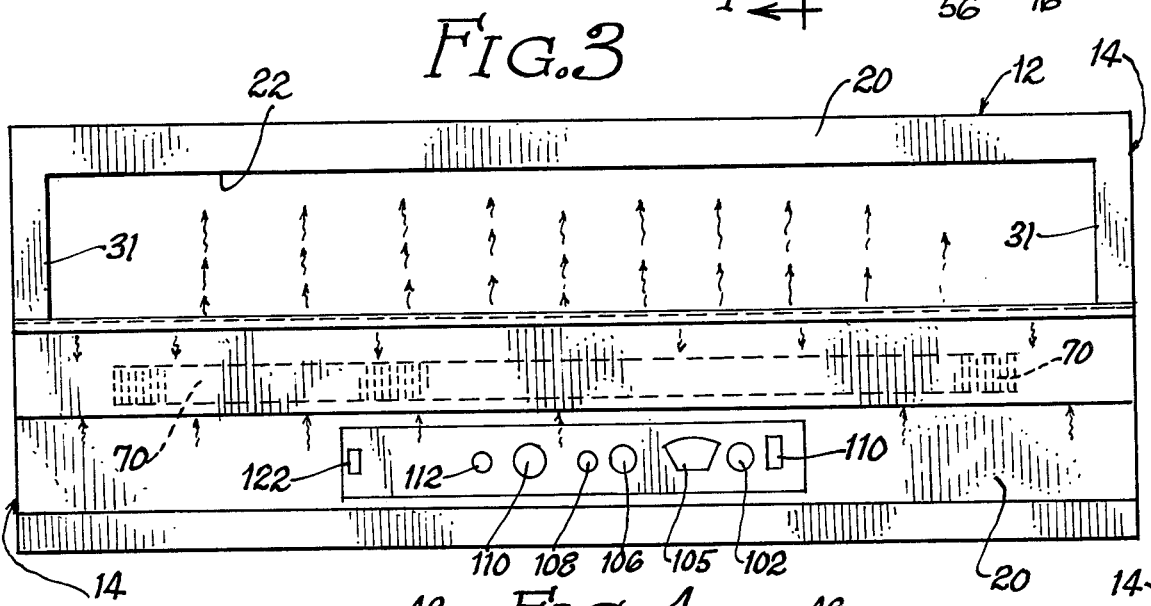
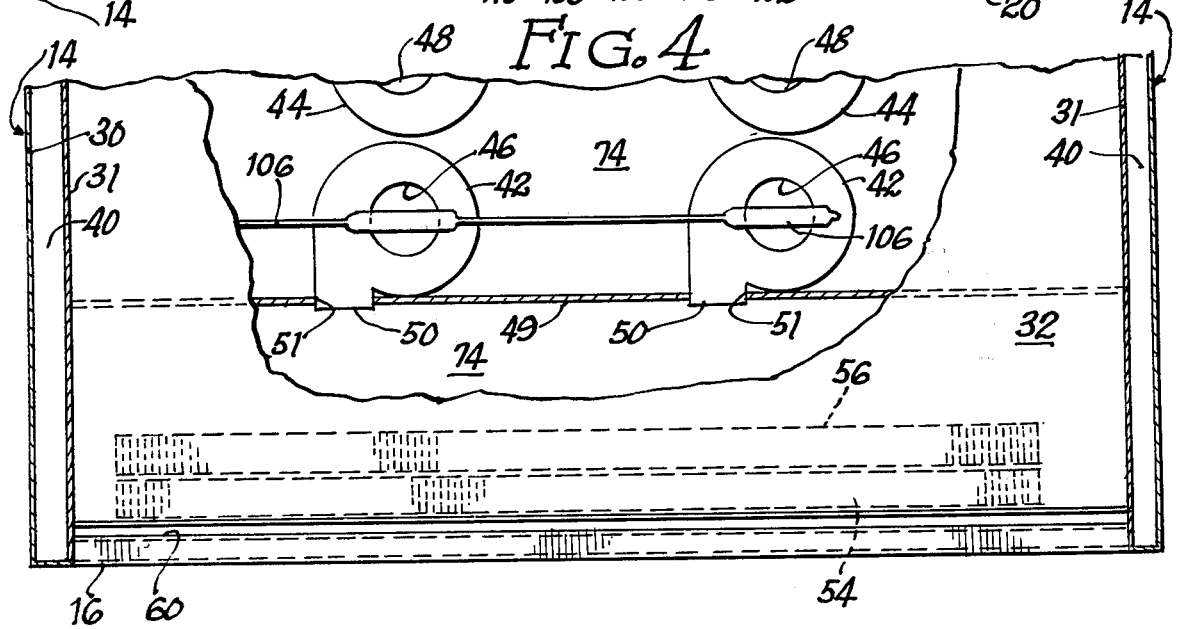

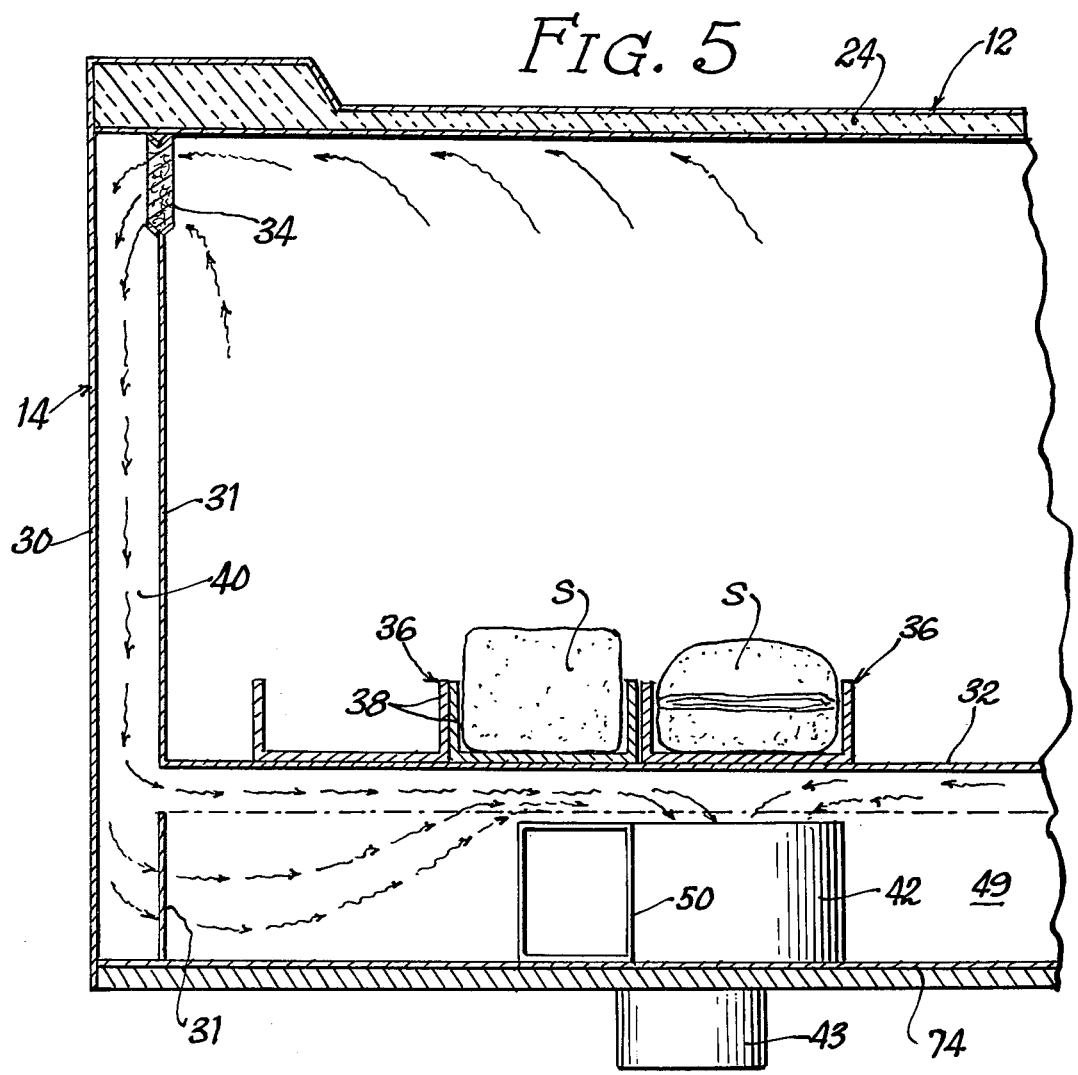
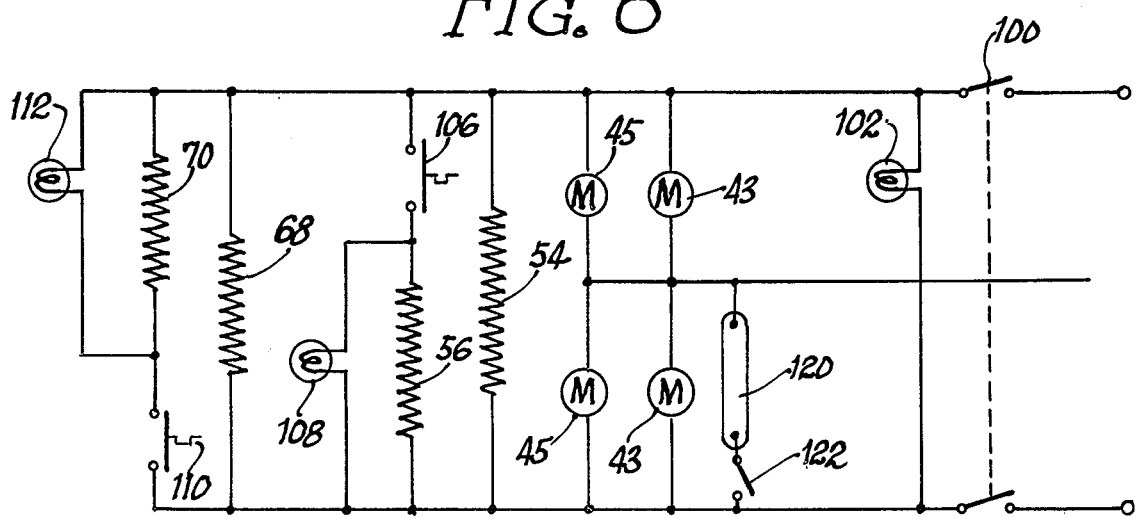

HEATED SANITARY SANDWICH BIN WITH AIR CURTAINS

This invention relates to a bin for maintaining sandwiches in a hot, moist condition and for holding them in that condition until they are to be served to a customer.

Fast food operations depend, in part, upon the preparation of food and sandwiches in anticipation of orders by customers. Thus sandwiches and other foods are sometimes prepared minutes before a customer orders them so that when the customer does order, he may be served immediately. For a quality operation, the quality of the food held for several minutes should be the same as, or very close to, that which is freshly made.

Substantial time and effort has gone into attempts to develop suitable holding bins for hot sandwiches, such as hamburger sandwiches, which will keep them both hot and moist, and which also make placement in and removal from the bin of such sandwiches quick and easy. However, all of the commonly available sandwich keepers leave something to be desired in one or more of these important regards.

One of the more prominently used sandwich bins is a pass-through bin having front and rear service openings and which is heated radiantly. Radiant heat tends to heat locally, cannot readily be measured and controlled as to internal bin temperature and tends to dry out sandwiches which are exposed to such heat. Although radiantly heated bins are better than some prior art sandwich keeping bins and have pass-through and first-in-first-out capabilities, the quality of the kept sandwich is not optimal.

The sandwich bin of this invention provides both first-in-first-out and pass-through capability and substantially improved means for keeping sandwiches hot and suitably moist. It provides for accurate temperature control and provides an atmosphere within the bin which minimizes desiccation of the sandwiches while keeping them at substantially elevated temperatures. This is accomplished by providing continuously heated air which curtains always-open front and rear service openings, which maintains an internal atmosphere which is hot and which replenishes the internal atmosphere without excessive internal air movement, thereby minimizing the transfer of moisture from the sandwiches to the heated air.

Of course air curtains are known and are widely used for diverse purposes, some of which have related to food keeping. For example, U.S. Pat. Nos. 25,735, 3,123,988 and 3,306,068 disclose typical devices having air curtains for maintaining refrigerated atmospheres in stores without the employment of doors. Kirk U.S. Pat. No. 907,609 discloses the use of blasts of air to protect bakery products, and the like, from flies, dust and other foreign materials. Bressickello U.S. Pat. No. 3,502,020 discloses a food display and warming device which provides a curtain of heated air which flows upwardly between a frontal access opening of a display cabinet and moving trays of a conveyor on which food products are supported for removal through the access opening.

However, these prior art devices do not provide for many of the advantages derived from the sandwich bin of this invention.

Sandwich bins in accordance with this invention provide a controllable internal atmosphere which may be held nearly uniform throughout the sandwich holding area, without localized substantially elevated temperatures and which shields the sandwiches from desiccating drafts and cold air. The bin provides an atmosphere which may be controlled and maintained at different elevated temperature levels, all while providing always-open service openings through which sandwiches may be introduced and from which they may be removed without interference.

These advantages and others are achieved by the provision of a sandwich bin which generates temperature controlled air curtains at its front and rear service openings and which comprises a housing including a front wall, a rear wall, a top, a pair of side walls and a bin floor, said front and rear walls each defining an always-open service opening substantially across the width of the bin through which sandwiches may be inserted and from which they may be withdrawn in first-in-first-out order. A plurality of guided means are provided for guiding rows of sandwiches from the rear service opening to the front service opening.

The bin further includes front blowers and rear blowers which have associated air intakes. Duct means receive the discharge of the blower and communicate with discharge nozzles at the front and rear service openings. The nozzles discharge air curtains across the front and rear service openings. Heaters are disposed in the ducts for heating the air to be discharged through the nozzles, and the housing defines air return chambers for receiving air from the air curtains and for providing for return of air to the air intakes. Preferably, the ducts have means for diffusing the air across the width of the nozzles to provide relatively uniform air curtains for the front and rear service openings.

The air return chambers are each defined by a side wall and a corresponding inner wall which terminates forwardly and rearwardly in the front wall and in the rear wall. Each inner wall has a top or upper edge which is spaced from the top of the housing and defines an inlet for air to be introduced into the chamber. A filter is positioned in that space. Air is returned from the chamber, below the bin floor and to the blowers for recirculation as an air curtain.

The blowers are positioned between the bin floor and the base and force air into the ducts. Air flows through the ducts and is discharged through nozzles, forming air curtains across the width of the front and rear service openings. The blowers cause air to recirculate by entering the chambers through the inlets and exiting the chambers through the outlets.

Further objects, features and advantages of this invention will become apparent from the following description and drawings, of which:

FIG. 2 is a front elevational view of a sandwich bin of this invention;

FIG. 3 is a rear elevational view of the sandwich bin of FIG. 2;

FIG. 4 is a cross-sectional view, partially broken away, taken substantially along plane 4—4 of FIG. 1;

FIG. 5 is a fragmentary cross-sectional view taken substantially along plane 5—5 of FIG. 1; and FIG. 6 is a circuit diagram of the sandwich bin of FIG. 2.

Figure 1:
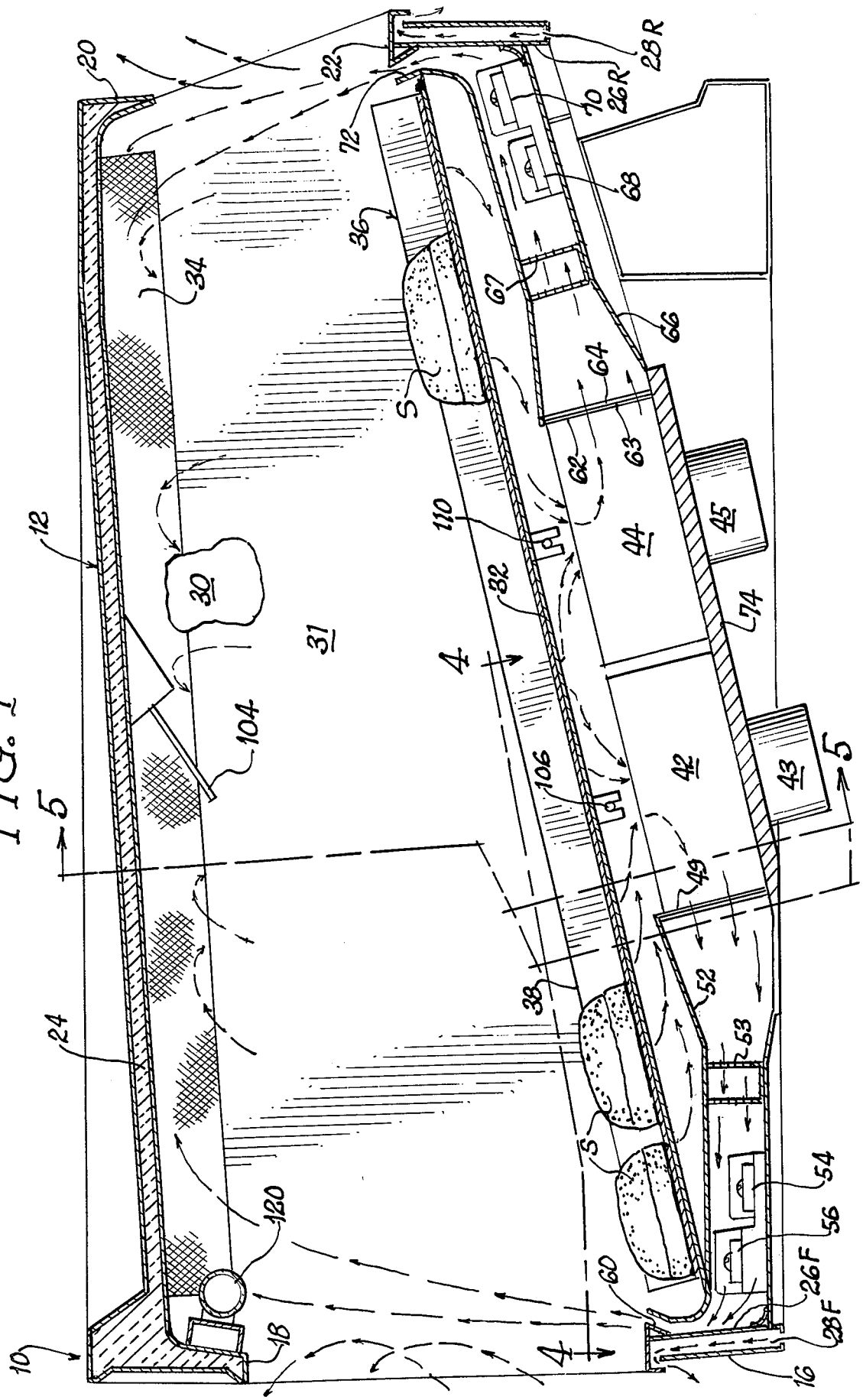
FIG. 1 is a cross-sectional view of a sandwich bin of this invention taken substantially along the plane 1—1 of FIG. 2.

Referring now to the drawings, a pass-through sandwich bin 10 of this invention comprises an external shell or housing, including an insulated top 12, sides 14, a front wall 16 defining a front access or service opening 18 and a rear wall 20 defining a rear access or service opening 22. Top 12 includes a pair of formed metal sheets between which a layer of insulation 24 is disposed. The lower reaches of front wall 16 includes an internal wall portion 26F which, with a portion of front wall 16, defines an air chamber 28F (see FIG. 1) through which air may pass by convection to keep the lower portion of front wall 16 reasonably cool to the touch. Similarly an internal wall portion 26R defines an air chamber 28R through which air may pass by convection to keep the lower portion of rear wall 20 reasonably cool to the touch.

Bin sides 14 each include an outer side wall 30 and an inwardly spaced inner side wall 31 which terminate at their lower edges in an interior bin floor 32. At their upper edges, side walls 31 abut suitably removable and replaceable filters 34 through which air to be heated passes. Inner walls 31 terminate forwardly and rearwardly in front wall 16 and in rear wall 20, respectively, where they are suitably secured as by welding or brazing. Thus, each inner wall 31 and its associated outer side wall 30 defines a chamber 40 which is closed by walls 16 and 20 at its front and rear, but which is open at its top via a filter 34 and open at its bottom to return air to be heated for recirculation through sandwich bin 10.

Suitable guides are provided for carrying and guiding sandwiches loaded through rear service opening 22 toward front service opening 18. In the embodiment illustrated, a suitable plurality of guides each comprises formed sheet metal chutes 36 (FIGS. 1 and 5) which are open-topped and generally U-shaped in transverse cross section and which may easily be dropped into place and removed for cleaning. Side edges 38 serve to maintain and guide the sandwiches S which may be wrapped or boxed. A plurality of these may be located side by side to separate rows of sandwiches and to provide for first-in-first-out usage. Other guides and separators may be used as well, such as wire-form guides.

As illustrated in FIGS. 1, 4, and 5, blowers 42, 44 are provided below the bin floor 32 for recirculating air. Blowers 42, 44 have an intake side and a discharge side. Front blowers 42 draw air in at their intake side through air intakes 46 (FIG. 4), whereas rear blowers 44 draw air inwardly at their intake sides through air intakes 48. The front blowers 42 discharge air at their discharge sides through discharge passages 50 which extend through openings 51 in the right wall 49 of discharge duct 52. Front wall 49 closes one end of the duct. Discharge duct 52 tapers to restrict the area through which the air passes, thereby increasing the velocity of the air. Further, a generally U-shaped perforated sheet metal baffle 53 is provided in duct 52 to help diffuse the air across the width of the duct and also to increase its velocity locally.

Heater means for increasing the air temperature are provided at the forward end of the duct 52. Heaters 54, 56 may be finned electric strip heaters. Innermost heaters 54 are preferably always on and outermost heaters 56 are preferably of the on-off type and are under the control of a suitable thermostat. After the air discharged by blowers 42 passes through baffle 53 and over heaters 54, 56, and it has then been suitably heated, the air passes through a discharge nozzle 60 which extends across the width of the service opening 18. Because the cross-sectional area of nozzle 60 is substantially reduced, the air is discharged at a relatively high velocity, thereby to direct it upwardly to provide a heated air curtain across the front of the sandwich bin 10 and to curtain the front service opening 18.

Similarly, rear blowers 44 provide a heated air curtain for rear service opening 22. To that end, air drawn through air intakes 48 is discharged through discharge passages 64 into a tapered discharge duct 66. Like duct 52, duct 66 has a front wall enclosing one end of the duct and provides openings for passages 64 through which air is discharged from the blowers 44. Duct 66 extends across the width of the bin. The air passes through a U-shaped baffle 67, which is like baffle 53, and then passes over heaters 68, 70. Heaters 70 are thermostatically controlled and heaters 68, like heaters 54, are always on. After being suitably heated, the air passes through a rear discharge nozzle 72 which extends across the width of service opening 22 where its velocity is suitably increased to provide an air curtain for rear service opening 22.

Of course, some of the heated air mixes with ambient air and escapes from the bin. Also, some of the heated air diffuses inwardly of the bin to provide and to help maintain an internal atmosphere which is well above ambient temperature. However, there is relatively little air movement internally of the sandwich bin, thereby minimizing drying out of the sandwiches contained in the bin.

Blowers 42, 44 are positioned on base 74 which is spaced from bin floor 32 and disposed therebeneath. Base 74 is secured to the bottom wall of ducts 52 and 66 and together extend between internal wall portions 26F, 26R and sides 14 to enclose the bottom of chambers 40 and to provide for the return of air to air intakes 46, 48 below bin floor 32.

Some of the heated air, and air from the internal atmosphere of the bin, is continuously recycled and returned to the blower section for reheating. As shown in FIGS. 1, 2, and 5, the recycled air first passes through filters 34 at the upper sides of the inner side walls 31. Grease and dust and other foreign particles are removed by the filters 34 and the clean air is then drawn downwardly through the chambers 40 to below the bin floor 32. From there, the air is drawn inwardly below the bin floor, where it is again drawn through blower air intakes 46, 48 for reheating and recirculation.

Referring now to FIG. 6, power is supplied via a suitable 240 volt power source. A suitable on-off switch 100 operates the circuitry when it is in the on position, that is indicated by a power-on indicator lamp 102. Front and rear blowers 42, 44 are powered by suitable motors 43, 45, respectively.

A thermocouple 104 (FIG. 1) is provided for indicating the temperature at its location, in bin 10. This operates a pyrometer 105 which gives a direct temperature reading. The on-off heaters are not controlled by thermocouple 104, but rather by thermostats, preferably located near the air intakes 46, 48 to sense the temperature of the return air before it is heated for recirculation.

On-off heaters 56 are under the control of a suitable adjustable thermostate 106. In the embodiment illustrated, thermostat 106 is of the bulb type and has two bulbs, one for each air intake 46, as shown in FIG. 4. The bulbs are connected by suitable capillary tubing, all of which is suitably supported in bin 10, which operates a thermostatic switch to energize heaters 56. A suitable lamp 108 is provided to indicate when heaters 56 are on. A similar thermostat 110 and indicator lamp 112 are provided for the rear on-off heaters 70. A fluorescent lamp 120 is provided in the bin to enhance visibility of the contents. Lamp 120 is preferably provided with a plastic safety shield to contain glass if, for any reason, the lamp should break. A suitable on-off switch 122 is provided for lamp 120.

A typical sandwich bin constructed in accordance with this invention may be about 60 inches wide, about 42 inches deep and about 22 inches high at the front. The heaters may be finned electric heaters about 55 inches long. The filters may be replaceable metal filters which can suitably snap into guide channels or spaced clips for retention and easy removal.

The side walls define chambers approximately two inches wide. Nozzles 60 and 72 extend across the width of the access openings and are approximately ¼ inch wide. Blowers 42 and 44 at the front and the rear at their rated speeds are each capable of moving approximately 187 cfm of air through each of the nozzles.

In using the air curtain bin disclosed herein, sandwiches have been kept hot and moist, and for much longer than in prior art sandwich bins, such as in those using radiant heat. Sandwiches do not tend to dry out or cool as quickly as they do in a radiant heated bin. Further, temperatures within the air curtain bin are not only controllable, but they can be accurately measured. On the other hand, temperatures in a radiant bin cannot be effectively measured; therefore, temperature adjustment and attempts at control is guesswork at best.

The air curtains not only shield the sandwich product from cold air blasts, but also act to retain the heat in the sandwich storage area within the bin. On the other hand, radiant bins act like chimneys, continually allowing cool ambient air to pass over the product, necessitating more intensive radiant heat penetration into the product, which in turn produces undesired crusting of the sandwiches. Holding temperatures in a range of 130°–160°F. are obtainable with the bin of the present invention and are maintained quite uniformly throughout the bin.

Although but one presently preferred embodiment of this invention has been disclosed, it will be apparent to those skilled in the art that modifications may be made without departing from the spirit and scope of this invention. Accordingly, it is not intended to be limited, except insofar as may be necessary in accordance with the claims.

What is claimed is:

1. A sanitary sandwich bin for maintaining elevated temperatures therewithin without excessive desiccation of sandwiches kept therein and providing front and rear alway-open service openings, comprising a housing, said housing including a front wall, a rear wall, a thermally insulated top, a pair of side walls and a floor, said front and rear walls each defining an always-open service opening substantially across the width of the bin through which sandwiches may be inserted and from which they may be withdrawn in first-in-first-out order, and guide means for guiding rows of sandwiches from the rear service opening to the front service opening, front blowers and rear blowers having an intake side and a discharge side, a rear air discharge nozzle across the width of the rear service opening for discharging an air curtain across the rear service opening, a front air discharge nozzle across the width of the front service opening for discharging an air curtain across the front service opening, separate duct means communicating the discharge of each of said front and rear blowers with its respective front and rear nozzles, electric heaters in said front and rear ducts for heating the air to be discharged through said nozzles, and air-return chambers defined by said housing for receiving air from the air curtains and communicating with the intake side of said blowers.

2. A sanitary sandwich bin in accordance with claim 1 further comprising means in said ducts for diffusing the air across the width of said nozzles thereby to provide relatively uniform air curtains across the front and rear service openings.

3. A sanitary sandwich bin in accordance with claim 1 including air filters communicating with said chambers to filter the air to be returned to the intake sides of said blowers.

4. A sanitary sandwich bin in accordance with claim 1 wherein each said chamber is defined by one side wall and by a corresponding inner wall spaced therefrom which terminates forwardly and rearwardly in said front wall and in said rear wall.

5. A sanitary sandwich bin in accordance with claim 4 wherein said air is drawn through said air chambers by said blowers and beneath said floor for return to the blower intake sides.

6. A sanitary sandwich bin in accordance with claim 1 wherein said front heaters and said rear heaters each comprises a pair of heater means, one of said heater means in each pair being always on, and temperature control means for the other of said heater means in each pair for selectively energizing and de-energizing said other heater means in each pair as the temperature sensed increases and decreases.

7. A sanitary sandwich bin in accordance with claim 4 wherein said inner wall has a top which is spaced from said top of said housing and further including air filters which are positioned between said top of each said inner wall and said top of said housing in the path of the air to be returned to the air intake sides of said blowers.

8. A sanitary sandwich bin in accordance with claim 1 wherein said guide means comprise open-topped, generally U-shaped chutes.

9. A sanitary sandwich bin in accordance with claim 4 wherein each said duct has a bottom wall, and said housing further comprises closure means merging with said bottom walls, said closure means and said duct bottom walls extending between said front wall and said rear wall and between said pair of side walls to close off the bottom of said air-return chambers.

10. A sanitary sandwich bin in accordance with claim 1 wherein the lower reaches of said front wall and said rear wall include corresponding internal wall portions which, with a portion of said front wall and said rear wall, define air chambers through which air may pass by convection to keep the lower portions of said front wall and said rear wall cool to the touch.

11. A sanitary sandwich bin in accordance with claim 1 wherein said ducts are tapered to restrict the area through which air passes to increase the velocity of the air, and said diffusing means comprises baffles which also locally increase the velocity of the air.

12. A sanitary sandwich bin in accordance with claim 1 wherein said ducts have a front wall provided with openings for receiving the discharge of air from said blowers, said front wall preventing air from escaping from said ducts.

* * * * *